(12) United States Patent
Friesenhahn, Jr. et al.

(10) Patent No.: US 7,178,481 B1
(45) Date of Patent: Feb. 20, 2007

(54) AUTOMATED GAME FEEDER SYSTEM

(76) Inventors: Lawrence Friesenhahn, Jr., 1204 Zanderson Ave., Jourdanton, TX (US) 78026; Lawrence Friesenhahn, Sr., 1204 Zanderson Ave., Jourdanton, TX (US) 78026

( * ) Notice: Subject to any disclaimer, the term of this patent is extended or adjusted under 35 U.S.C. 154(b) by 53 days.

(21) Appl. No.: 11/037,741

(22) Filed: Jan. 18, 2005

(51) Int. Cl.
*A01K 1/00* (2006.01)
(52) U.S. Cl. ..................................... 119/57.91
(58) Field of Classification Search ............. 119/57.91, 119/57.2, 57
See application file for complete search history.

(56) References Cited

U.S. PATENT DOCUMENTS

| | | | |
|---|---|---|---|
| 3,631,841 A * | 1/1972 | Poirot | 119/57 |
| 4,057,136 A * | 11/1977 | La Porte, Jr. | 119/57.91 |
| 4,667,623 A * | 5/1987 | Swartzendruber | 119/57.2 |
| 5,421,290 A | 6/1995 | Welch | |
| 5,794,563 A | 8/1998 | Klepac | |
| 6,152,078 A * | 11/2000 | Romeu Guardia | 119/57 |
| 6,622,653 B1 * | 9/2003 | Starnes, Jr. | 119/51.01 |
| 2002/0185075 A1 * | 12/2002 | Glover et al. | 119/57.91 |

* cited by examiner

*Primary Examiner*—Thomas Price
(74) *Attorney, Agent, or Firm*—John Karl Buche

(57) ABSTRACT

An automated game feeder system that features a novel lid with a preferable vent and intake tube, said intake tube adapted for connection to a mechanized feed supplier. The lid permits re-supply of feed to the game feeder without resort to ladders or the need to remove a lid to accept the feed. An alternate embodiment is disclosed featuring a game feeder with the benefits of a lid built directly into a top of a stand-alone game feeder.

16 Claims, 3 Drawing Sheets

AUTOMATED GAME FEEDER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The present invention relates to the field of automated game feeders.

2. Description of Prior Art

As any hunter will recount, it can be a tremendous hassle to restock a game feeder. Most feeders feature a feed holder elevated above the ground, a lid that covers the feed holder, and a feed dispenser, which is typically disposed at a position beneath the stored feed so as to make use of gravity moving the feed downward. A problem with restocking a feeder is commonly encountered because the person restocking will usually have to remove the lid of the feeder and position a ladder on the feeder to get in a position to refill the feed holder. This manual refilling is not only a nuisance, but creates a safety concern as the person refilling is engaging in a complicated task while simultaneously balancing on a ladder leaned against the feeder. This problem is more significant if the user is attempting to restock the feeder when it is cold, icy, wet, or in the dark. An automated approach to refilling the feeder is desirable. Others, such as Daniel Klepac, U.S. Pat. No. 5,794,563 addressed the issue of refilling a game feeder, however, his approach was to create a winch system that physically raised and lowered the feed containing portion of the game feeder. This design, although useful, does not address the problems solved by the present invention in the same manner. Further, the invention relies on a more complicated array of moving parts than the present invention. Inventor William Welch, U.S. Pat. No. 5,421,290 (1995) also attempted to ease the burden of refilling a game feeder, however, his invention also involved use of a pulley and winch system that relies on lowering the feed holder to the feed. The present invention takes a different approach to solving the problem of resupply of a game feeder.

SUMMARY OF THE INVENTION

Accordingly, it is the objective of the present invention to provide a novel automated game feeder apparatus. The basic concept behind the invention is that of a game feeder featuring a special filling mechanism that neither relies on removal of a lid to re-supply the feed holder with feed nor moving the feed container toward the ground. Instead, the present invention features a lid adapted to fit over game feeders with the lid featuring both a preferable vent and supply tube adapted to connect the feed holder to a mechanized feed supplier. It is an objective of the present invention to provide a game feeder that is easy and safe to re-supply without the need of ladders and unnecessary inconvenience.

It is a further object of the present invention to provide a novel lid that fits commercially available game feeders, so that such game feeders may be adapted to utilize mechanized methods for re-supply of feed.

It is an object of the present invention to provide a stand-alone game feeder, with this embodiment having the same benefits of a lid that features vent and supply tube attachments.

It is an object of the present invention to connect a game feeder to a mechanized feed trailer that will be used to fill the game feeder.

It is a further object of the present invention to provide a trailer of solid construction, and durable for use in the field.

Other objectives of the invention will become apparent to those skilled in the art once the invention has been shown and described.

BRIEF DESCRIPTION OF THE DRAWING

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
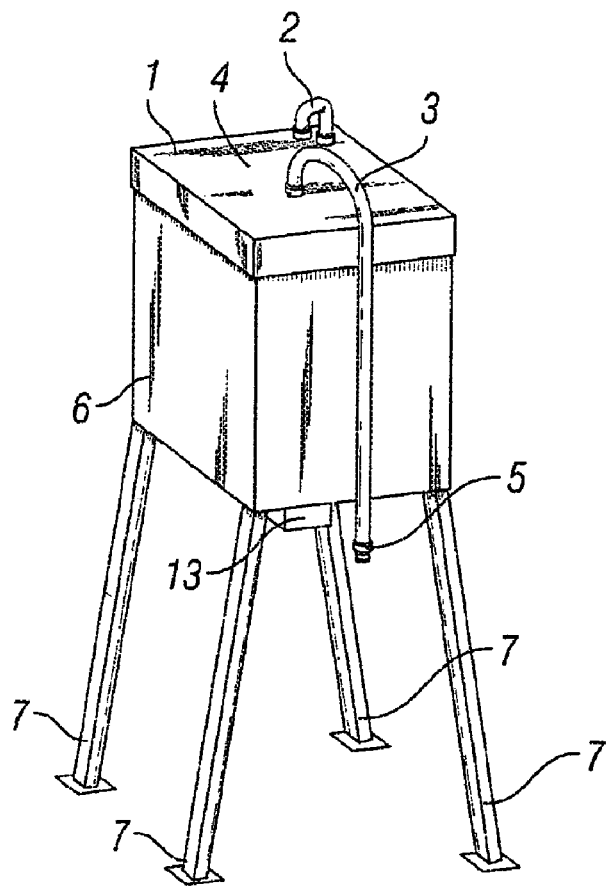
FIG. 1 is a frontal perspective view of a game feeder featuring a lid with vent and intake tube attachments that permit connection to a mechanized feeding apparatus.
Figure 5:
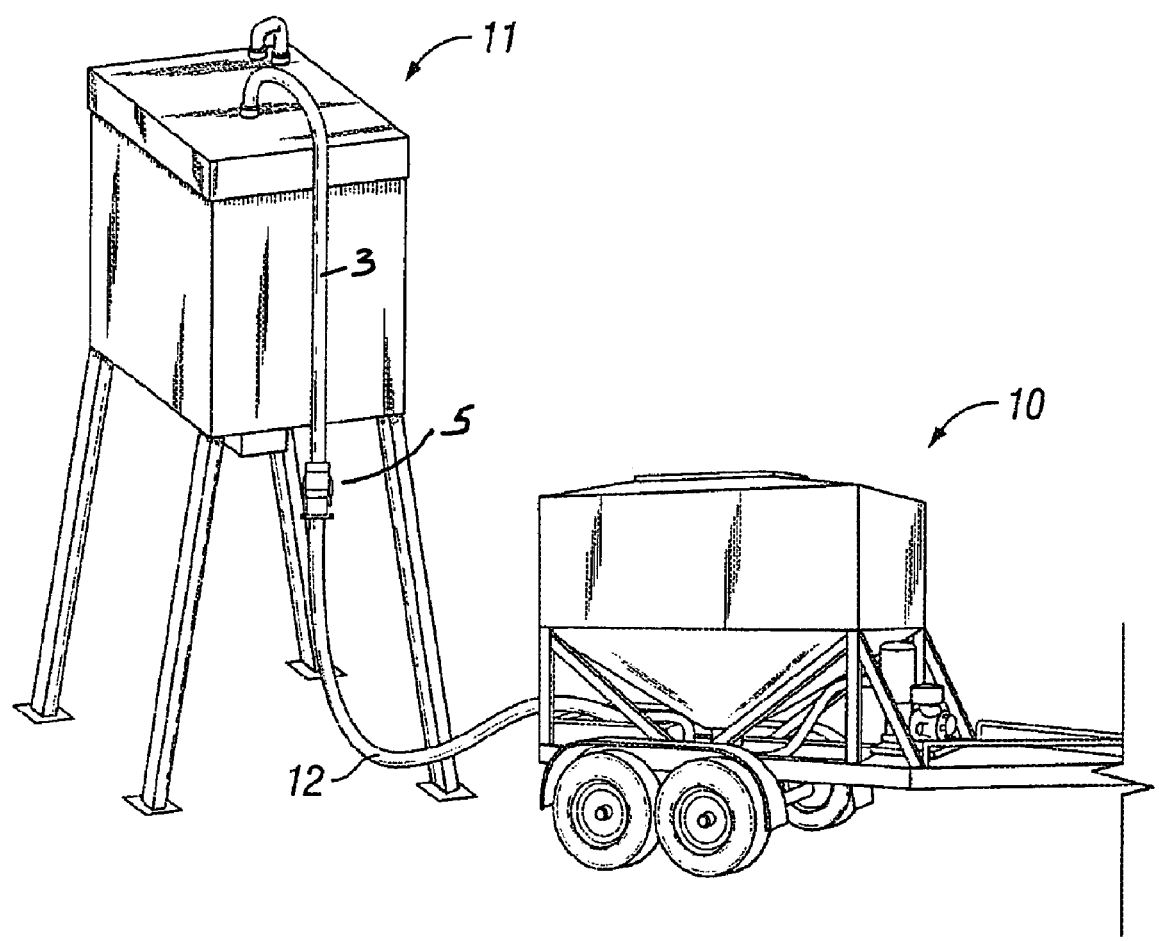
FIG. 5 is a perspective view of the game feeder system of the present invention featuring the unique vent, intake tube, and supply hose being used to connect the game feeder to a mechanized feed supplier.

FIG. 1 is a frontal perspective view of a game feeder featuring a lid 1 with a preferable vent 2 and a intake tube 3 that permit connection of a feed holder 6 to a mechanized feed supplier 10 (see FIG. 5). The lid 1 of the present invention is adapted to fit and mount to the tops of existing and commercially available game feeders. The lid 1 depicted is rectangular, however, it is made in as many shapes and sizes as will accommodate commercially available game feeders. Lids with the novel features are also frequently custom fit to the dimensions of a particular customer's individual feeder size requirements. The lid is adapted to fasten securely to the top of a game feeder given that once it is secured, it will not be necessary to remove the top to re-supply feed. Fastening means may include, but are not limited to a close fit with the underlying feeder, latches, buckles, or a close fit enhanced by insulators (e.g., rubber, plastic, foam). The lid 1 may be made from metal, metal alloys or plastic. Further, it may be formed of pressure-molded materials, cast or welded metals, metal alloys, or composite materials (e.g., polymer based, carbon-based, ceramic blends, etc.). The lid 1 fits over the top of a game feeder in a fashion similar to how a shoebox lid would fit over a shoebox. Consistent with this description, the lid is typically defined by lip a situated around the periphery of the top surface of the lid and extending downward therefrom. Securely fixed to a top surface 4 of the lid 1 is at least one intake tube 3 preferably connected to the top surface 4 at a first end of the intake tube 3. The connection at this first end of the intake tube 3 must be secured during use, but may also be detachable to facilitate cleaning and maintenance. The intake tube 3 may also be adapted to fit on a side of the lid 1. This intake tube 3 is hollow and permits flow of feed from a mechanized feed supplier 10 through the intake tube 3 so that it is injected into a feed holder 6. All game feeders feature some means for holding feed such as the feed holder 6 shown, although feed holders and game feeders come in a various shapes and sizes. Because of the intake tube 3, it is not necessary to remove the lid 1 of the game feeder to resupply the game feeder. The lid 1 also serves the obvious feature of protecting the feed from the elements, namely, rain, snow, etc. The intake tube 3 features a diameter that is preferably in the range of ½ to 8 inches. The intake tube 3 is preferably U-shaped near the top of the intake tube 3 as shown in FIG. 1, as this shape has been useful in maximizing unobstructed feed flow. The intake tube 3 extends down along a side of the feeder so that it culminates at a connector means 5 disposed at a height in the range of 1 foot to 10 foot above the ground. This height range is preferable given that an important benefit of the present invention is to provide a means of resupply of a game feeder without the use or assistance of ladders by the user. The intake tube 3 may be formed of metal alloy, for instance, aluminum, made of plastic materials, or formed composite materials. The intake tube 3 may be welded to lid 1 (if metal) or may be molded or cast as a continuous unit, for instance a pressure molded plastic form or using composites. Also disposed preferably on a top surface 4 of lid 1 is a vent 2, with this vent 2 relieving pressure generated inside the feed holder 6 by the influx of air and feed from intake tube 3 which is connected to a mechanized feed supplier 10 (see FIG. 5). The vent 2 serves the primary feature of relieving pressure. The vent 2 may also be located on a side surface of the lid 1, or may not be preferable if the feeder unit has a vent 2 disposed elsewhere to relieve pressure created by pneumatic injection of feed. It may be formed of all the same materials used in the construction of the intake tube 3 or lid 1. Although a U-shape is not required of vent 2, the inventor has found this shape preferable in that a downward facing opening to the vent 2 prevents the ingress of rain, snow, etc. into the feeder. If a round shape is used for the vent 2, it will feature a diameter that is preferably in the range of ½ to 24 inches. Other shapes, including what amounts to a hole in the lid 1, can be used for the vent 2 and it can further be disposed on the side of the lid 1 or in the shape of a polygonal cutout. A second end of the intake tube 3 culminates in a connector means 5. This connector means 5 is adapted to place intake tube 3 and a supply tube 12 (see FIG. 5) in fluid connection and so that feed may be passed from a mechanized feed supplier 10 through supply tube 12, through intake tube 3 and into the feed holder 6. After supplying feed to the feed holder 6, connector means 5 is adapted to be disengaged. Also shown in FIG. 1 are those features common to most commercially available game feeders, namely a feed holder 6, a feed dispenser means 13 disposed beneath the feed holder 6, and a plurality of legs 7 attached to the feed holder 6. Also, it should be noted that the inventor contemplates that an indicator means, for instance, a window or other translucent modification may be used on the lid 1 or body of the game feeder to permit the user to be able to see when the feed holder 6 is full. Alternately, the indicator means may be an electronic monitor that notifies the user when the feed reaches a certain level. The lid 1 is also preferably pyramidal, or features an inverted cone shape when mounted to the feed holder 6 so that the feed holder 6 will accommodate additional feed, which feed when added will tend to form a mound with more feed accumulated in the center of a feed holder 6.

Figure 2:
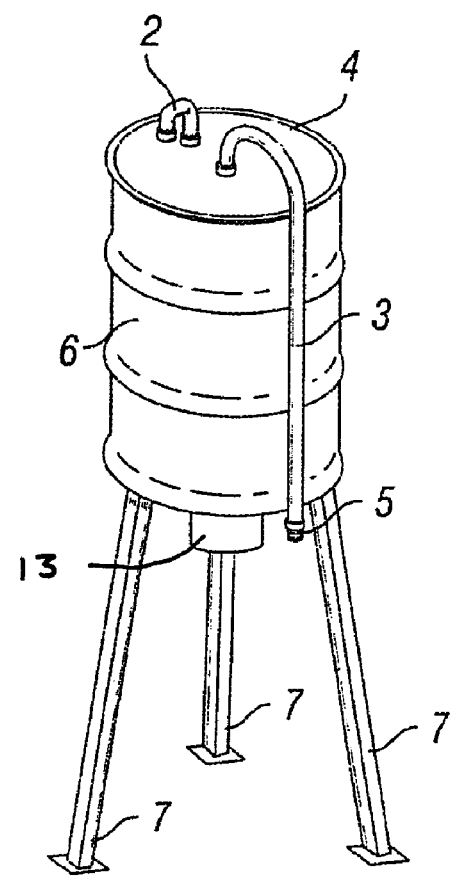
FIG. 2 is a frontal perspective view of a stand-alone game feeder featuring a top with vent and intake tube attachments that permit connection to a mechanized feeding apparatus.

FIG. 2 is a frontal perspective view of a stand-alone game feeder featuring a preferable vent 2 and intake tube 3 attachments that permit connection to a mechanized feeding apparatus 10. FIG. 2 features basic game feeder features, namely a plurality of legs 7, a feed holder 6, and a feed dispenser 13. The feed holder 6 is depicted in a preferable, although unnecessary barrel form. Rectangular, polygonal or square shaped stand-alone feeder shapes are also contemplated. The most important aspect of FIG. 2 is that in addition to these basic features, and unlike FIG. 1, this embodiment does not rely on a lid 1 that attaches to the top surface of the feeder. The stand-alone unit of FIG. 2 has the preferable vent 2 and intake tube 3 features described in FIG. 1 built preferably directly into the integrated top surface 4 of the game feeder. Alternately, the intake tube 3 and preferable vent 2 may be located along the side of the feeder, for instance at a top portion of the feed holder 6. The inventor has developed this stand-alone game feeder in all other respects with the benefits as are described in relation to FIG. 1.

Figure 3:
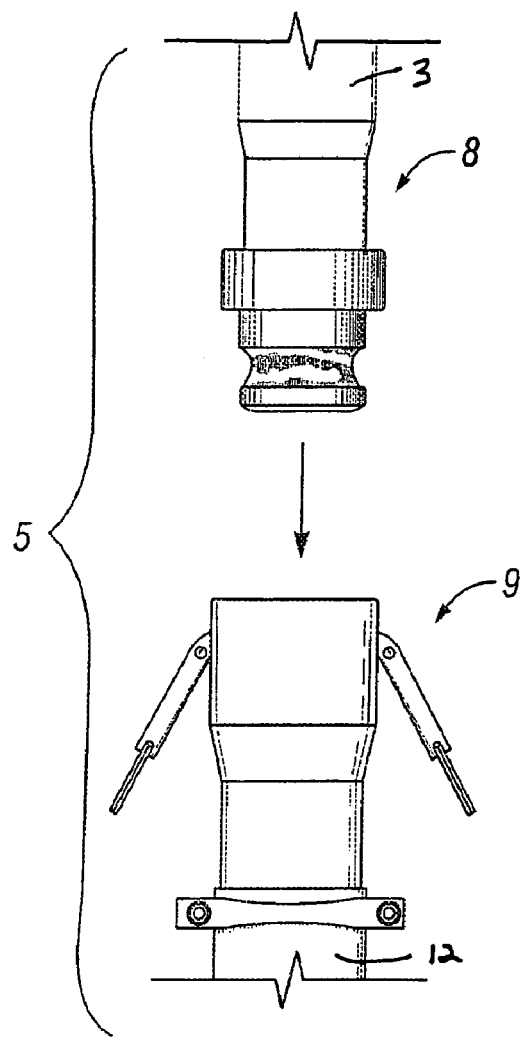
FIG. 3 is an expanded side view of a preferable connector means that is used to connect an intake tube from a game feeder to a mechanized feed supplier.

FIG. 3 is an expanded side view of a preferable connector means 5 that is used to connect an intake tube 3 from a game feeder (see FIGS. 1 and 2) to a supply hose 12, which supply hose 12 is used in connection with mechanized feed supplier 10 (see FIG. 5). Although connector means 5 may take many forms, FIG. 3 shows a preferable connector means formed from two components, namely: (a) an intake connector means 8 fixedly disposed at the second end of the intake tube 3, and (b) a supply tube connector means 9 fixedly disposed at a first end of a supply hose 12 with a second end of the supply hose 12 connected to mechanized feed supplier 10. The connector means 5 shown in FIG. 3 and comprised of intake connector means 8 and supply tube connector means 9 are commonly known as "banjo fittings." The primary function of such a connector means 5 is to couple a supply hose 12 to the intake tube 3 of the game feeder, whereby feed may be injected to the game feeder.

Figure 4:
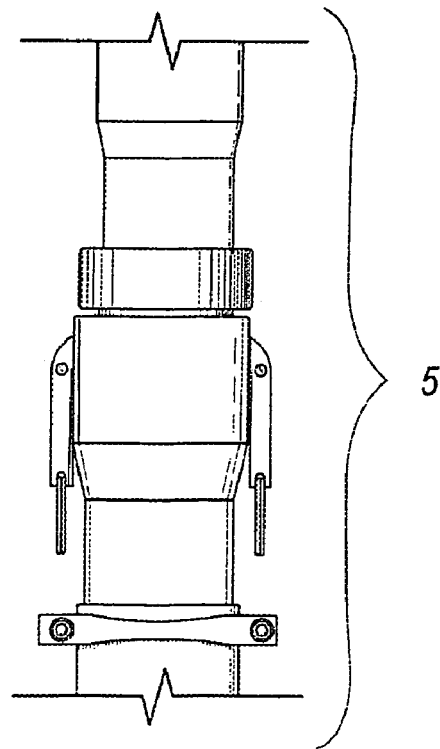
FIG. 4 is an expanded side view of a preferable connector means that is engaged and connecting an intake tube from a game feeder to a mechanized feed supplier.

FIG. 4 is simply an expanded side view of the connector means 5 shown in FIG. 3, but with the intake connector means 8 and supply tube connector means 9 engaged. Once engaged, the connector means 5 permits flow of feed into the feed holder 6 from the mechanized feeder supplier 10. As soon as the game feeder is resupplied with feed, the connector means 5 is preferably disengaged.

FIG. 5 is a perspective view showing the mechanized feeder supplier 10 connected to a supply hose 12, which in turns connects to an intake tube 3 of game feeder unit 11 at connector means 5. The game feeder unit 11 may be a game feeder featuring either a lid 1, or a stand-alone game feeder as depicted in FIG. 2, wherein the top of the game feeder incorporates features as described on the lid 1. The mechanized feed supplier 10 is depicted as a trailer unit, which is typical of a mechanized feed supplier 10 marketed by Atascosa Wildlife Supply in Jourdanton, Tex. under the QuikFeed™ trademark. The inventor believes that such a mechanized feed supplier 10 is preferable to use in connection with the game feeder apparatus given that it employs pneumatic means to rapidly deliver large quantities of feed, such as corn, pellets and milo to a game feeder. However, the game feeder unit 11 is adapted to fit all commercially available mechanized feed suppliers 10, namely pneumatic feeders, which are commercially available for supplying feed. The supply hose 12 shown in FIG. 5 is preferably made from materials such as rubber, metal, corrugated plastic, nylon, flexible plastics, reinforced fabrics and their equivalents. Such a supply hose 12 is preferable of a length in the range of 2 to 100 feet in length; and with a preferable diameter in the range of 1 to 10 inches.

It is to be noted, however, that the appended drawings illustrate only typical embodiments of this invention and are therefore not to be considered limiting of its scope, for the invention may admit to other equally effective embodiments.

We claim:

1. A game feeder lid comprising:
   (a) a top surface featuring a lip adapted to fit over a feed holder of a game feeder;
   (b) at least one intake tube securely connected to said top surface at a first end of said intake tube; and,
   (c) a connector means disposed at a second end of said intake tube wherein said connector means is formed from an intake connector means fixedly disposed at said second end of the intake tube, and a supply tube connector means fixedly disposed at a first end of a supply hose with a second end of the supply hose connected to a mechanized feed supplier; and,
   (d) whereby said game feeder lid permits the user to resupply said feed holder by injecting feed into said feed holder by and through said intake tube.

2. The game feeder lid of claim 1 wherein said intake tube features a diameter that is preferably in the range of ½ to 8 inches.

3. The game feeder lid of claim 1 wherein said second end of said intake tube is disposed at a height in the range of 1 foot to 10 foot above the ground.

4. A game feeder comprising:
   (a) a feed holder;
   (b) a plurality of legs securely fixed to and supporting said feed holder;
   (c) a feed dispenser means fixed to an underside of said feed holder;
   (d) a top surface fixedly connected to said feed holder along the periphery of said top;
   (e) at least one vent disposed on said game feeder;
   (f) at least one intake tube securely connected to said game feeder at a first end of said intake tube; and,
   (g) a connector means disposed at a second end of said intake tube;
   (h) whereby said game feeder permits the user to resupply said feed holder by injecting feed into said feed holder by and through said intake tube.

5. The game feeder of claim 4 further comprising a connector means formed from (a) an intake connector means fixedly disposed at said second end of the intake tube, and (b) a supply tube connector means fixedly disposed at a first end of a supply hose with a second end of the supply hose connected to a mechanized feed supplier.

6. The game feeder of claim 4 wherein said intake tube features a diameter that is preferably in the range of ½ to 8 inches.

7. The game feeder of claim 4 wherein said second end of said intake tube is disposed at a height in the range of 1 foot to 10 foot above the ground.

8. The game feeder of claim 4 further comprising and indicator means to inform the user when said feed holder is full.

9. A game feeder system comprising:
   (a) a game feeder unit featuring at least one intake tube securely connected to said game feeder;
   (b) said intake tube securely connected to said game feeder at a first end of said intake tube;
   (c) a connector means disposed at a second end of said intake tube;
   (d) a supply hose adapted on one end to connect to said intake tube at such connector means; and,
   (e) a mechanized feed supplier connected to another end of said supply hose;
   (f) whereby said game system permits the user to resupply said game feeder unit by injecting feed from the mechanized feed supplier into said game feeder unit by and through a supply hose and through said intake tube.

10. The game feeder system of claim 9 further comprising a connector means formed from (a) an intake connector means fixedly disposed at said second end of the intake tube, and (b) a supply tube connector means fixedly disposed at a first end of said supply hose with a second end of the supply hose connected to said mechanized feed supplier.

11. The game feeder system of claim 9 wherein said intake features a diameter that is preferably in the range of ½ to 8 inches.

12. The game feeder system of claim 9 wherein said second end of said intake tube is disposed at a height in the range of 1 foot to 10 foot above the ground.

13. The game feeder system of claim 9 wherein said mechanized feed supplier is on a trailer.

14. The game feeder system of claim 9 further comprising a supply tube of a length in the range of 2 to 100 feet in length.

15. The game feeder system of claim 9 wherein said supply tube is of a diameter in the range of 1 to 10 inches.

16. The game feeder of claim 9 further comprising and indicator means to inform the user when said feed holder is full.

\* \* \* \* \*